Dec. 6, 1949 H. ZIEBOLZ 2,490,188
CONTROL SYSTEM
Filed Dec. 17, 1945 2 Sheets-Sheet 1
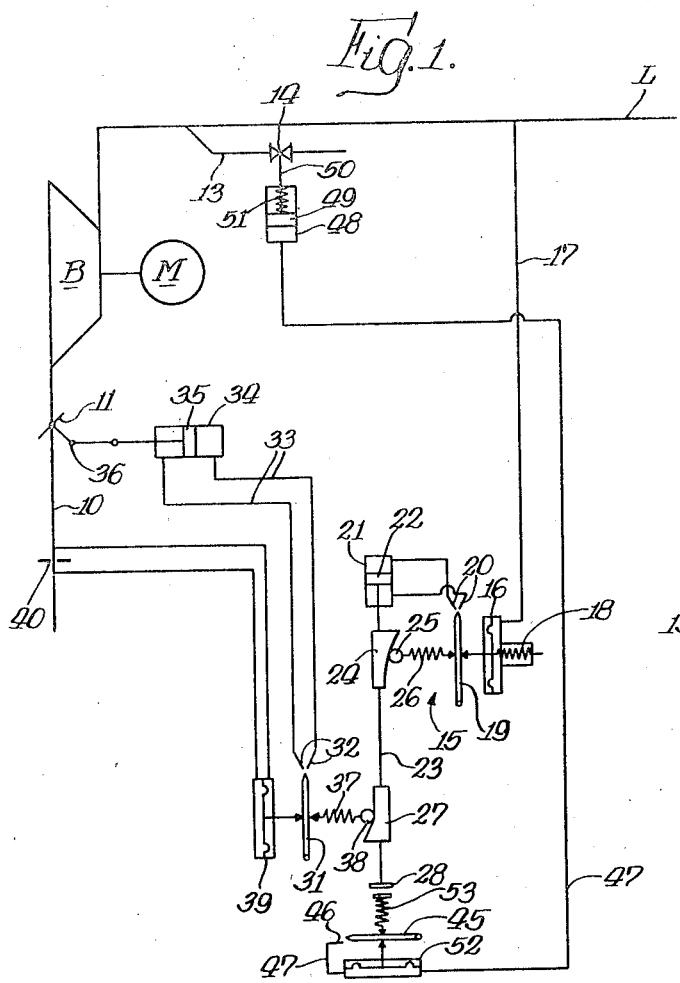
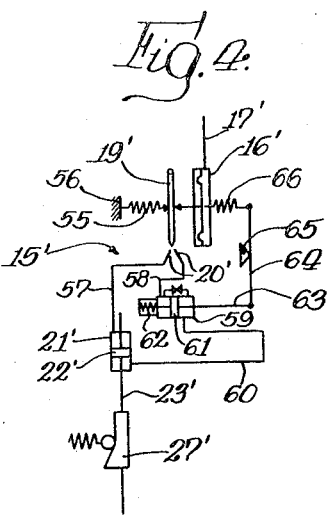
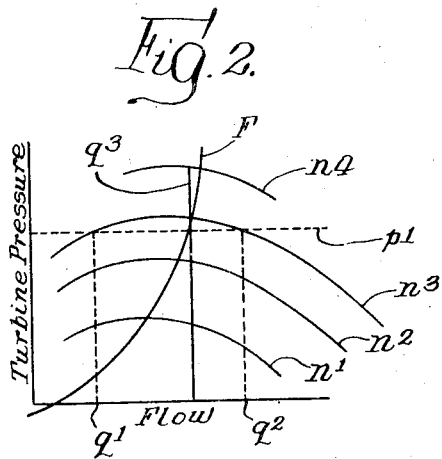
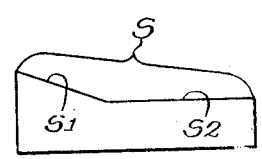
INVENTOR.
Herbert Ziebolz

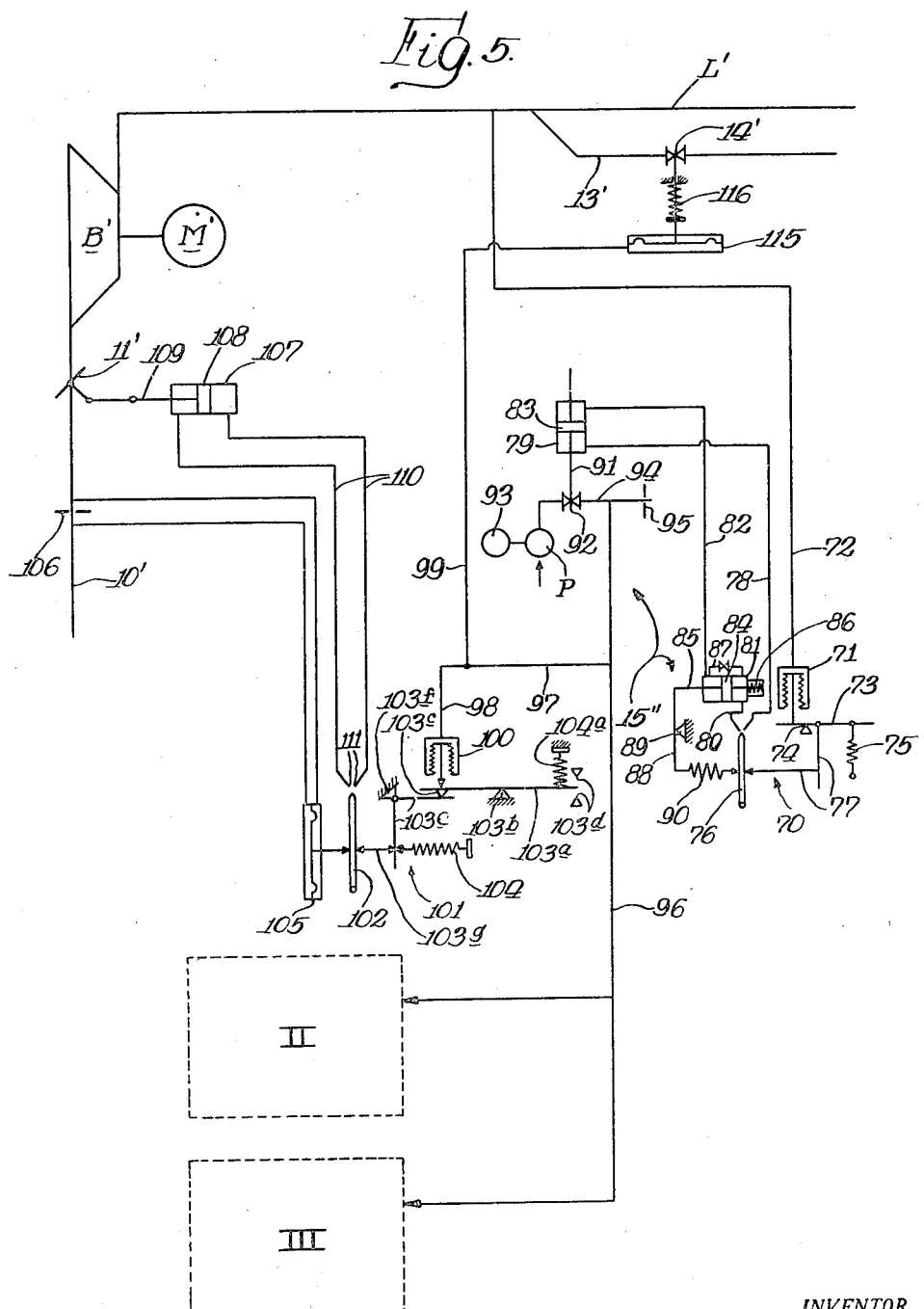

Patented Dec. 6, 1949

2,490,188

UNITED STATES PATENT OFFICE 2,490,188

CONTROL SYSTEM

Herbert Ziebolz, Chicago, Ill., assignor to Askania Regulator Company, Chicago, Ill., a corporation of Illinois Application December 17, 1945, Serial No. 635,563

15 Claims. (Cl. 230—115)

1

The invention relates generally to a system for controlling a variable condition, such as pressure, temperature, rate of flow, or the like, and particularly to a system for controlling such conditions under circumstances wherein the condition is rendered highly unstable due to employment of inherently unstable devices in the production of the condition.

Devices that are inherently unstable, for example, blowers and certain types of electric motors, usually have a generally parabolic performance curve. Hence it is readily seen that for any ordinate value there are two abscissa values and unless proper provision is made the device jumps in operation from one abscissa value to the other. It becomes necessary, therefore, in controlling the condition produced by the device to maintain the device operating on one half of its performance curve, usually the half having the larger abscissa values. The extent to which the device may be adjusted thus is limited and an auxiliary means must be employed to aid in the control of the condition.

It is an object of this invention to provide, for an apparatus having an unstable primary device acting as a supply source influencing a condition to be controlled, a new and improved control system which assures proper control of the condition without hunting and yet is simple in construction and direct in operation.

Another object is to provide a control system employing an auxiliary means in addition to regulation of the primary condition generating or influencing device which precludes the primary device from operating on other than the proper portion of its performance curve.

Still another object is to provide a control system regulating a condition by control of a primary condition generating device and an auxiliary means in which the primary device and the auxiliary means are regulated in series in response to the condition to be controlled.

A further object is to provide a control system regulating a condition by control of a primary condition generating device and an auxiliary means in which the primary device and the auxiliary means are regulated in series in response to the condition to be controlled, the primary device being at all times regulated to operate above a certain minimum necessary to prevent shift to operation on the other slope of the performance curve.

Yet a further object is to provide a control system regulating a condition by a control of a primary condition generating device and an auxiliary means in which the auxiliary means comes into play only when the primary device is reduced to a permissible minimum of operation.

Other and more detailed objects and advantages will become apparent from the following detailed description taken in connection with the accompanying drawings, in which:

Fig. 1 is a diagrammatic illustration of a control system embodying the features of this invention.

Fig. 2 is a graph illustrating operation of a turbine blower.

Fig. 3 is an enlarged showing of one of the elements of Fig. 1.

Fig. 4 is a diagrammatic view illustrating a modified construction of a portion of the signal generating means of Fig. 1.

Fig. 5 is a diagrammatic view illustrating a modified form of control system.

While the invention is susceptible of various modifications and alternative constructions, it is shown in the drawings and will hereinafter be described in a basic embodiment and one modification. It is not intended, however, that the invention is to be limited thereby to the specific constructions disclosed. On the contrary, it is intended to cover all modifications and alternative constructions falling within the spirit and scope of the invention as defined in the appended claims.

Though the invention is adaptable for the control of a great variety of conditions, it is for exemplary purposes herein shown and will hereinafter be described as adapted to the control of air pressure in a line supplied by a turbine blower. A turbine blower has been selected because it is typical of various other apparatus that has an unstable operating characteristic making the problem of control thereof a particularly difficult one. Devices such as a turbine blower, certain types of electric motors, etc., have a generally parabolic operating characteristic with the result that there are two values of one particular operating factor that will satisfy a single value of some other operating factor. In a turbine blower, for example, if blower pressure is plotted against flow at different constant speeds of the blower, there will result a series of generally parabolic curves, such as $n1$, $n2$, $n3$ and $n4$ (see Fig. 2), in which as the flow increases the pressure increases for a while and thereafter decreases. It will thus be seen that for a given pressure $p1$, for example, there will be two flows $q1$ and $q2$ producing that desired pressure. Thus should the pressure in the line being supplied by the blower exceed the blower pressure for the flow $q2$, for example, the flow would be reduced and while there might temporarily be an increase in blower pressure (see $n3$ of Fig. 2), if that increase were not sufficient to overcome the line pressure, the flow would be further reduced and actually reversed, thus going from the value $q2$ to the value $q1$ and beyond. Such reverse flow would, of course, eventually reduce the pressure in the line and the flow would again jump to the higher flow value corresponding to the pressure $p1$ or any other pressure that might then be present in the line. It is to avoid this pumping operation of the blower that the control system herein disclosed has been designed.

Speaking generally, the condition to be controlled herein is air pressure in a line L. Influencing the condition to be controlled, namely, the air pressure, is a primary device, in this embodiment serving as a source and taking the form of a turbine blower B driven by a motor M. Also utilized to influence and control the condition to be controlled is an auxiliary means herein taking the form of a by-pass or bleeder 13 controlled by a valve 14 of appropriate character. In this embodiment, control of the condition is primarily exercised by regulation of the operation of the primary device or blower B with secondary control being exercised by regulation of the by-pass 13. To that end, the control system proper comprises generally a master means, more particularly, a master signal generating means 15, which is responsive to pressure in the line L and is operable to generate a signal which is a function of the pressure in the line L. Responsive to this signal is a control means for a means governing the operation of the primary device, that is, the blower B. While operation of the blower B, that is, flow of air therethrough, might be controlled either by regulation of the speed of the blower or by throttling, the governing means herein takes the latter form and thus comprises any suitable valve, such as a butterfly valve 11, disposed in an intake 10 to the blower B. Under these conditions, the blower is, of course, driven at a constant speed by the motor M. The control means and the governing means for the blower just described respond only to a certain portion or range of the signal generated by the signal generating means 15 and serve as a minimum flow regulator maintaining the flow of air from the blower on the high side of the maximum pressure generated by the blower at any given speed. Responsive to a signal calling for a reduction in flow below the minimum flow permissible is a means governing the auxiliary means, namely, the by-pass 13 through the valve 14. The means controlling the blower and the means controlling the auxiliary means, namely, the valve 14, can thus be said to operate in series in so far as response to the signal is concerned with the means controlling the valve 11 responding to a certain range or portion of the signal and with the means controlling the valve 14 responding to a different portion or range of the signal.

Turning now to a more detailed description of the control system, the signal generating means 15 (in Fig. 1) includes a jet pipe regulator of the Askania jet pipe type. Such a regulator comprises a pressure responsive device 16 which is connected by a conduit 17 to the line L and has a manually adjustable spring 18 for loading so as to adjust the regulator for maintaining any desired pipe line pressure. Pivotally mounted in well known manner and adapted to be actuated by the pressure responsive device 16 is a jet pipe 19 from which fluid is ejected under pressure against a pair of orifices 20. The orifices 20 are by suitable conduits connected to opposite ends of a cylinder 21 having a piston 22 reciprocable therein and connected to a rod 23 of considerable length. Carried by the rod is a cam 24 engaged by a follower 25 bearing against one end of a compression spring 26, the other end of which bears against the jet pipe 19. The cam 24 and spring 26 function in well known manner to vary the compression of the spring 26 in such manner as to offset the change in pressure to which the device 16 is subjected and thus restore the jet pipe 19 to its neutral position when a signal which is a definite function of the change in pressure in the line L has been generated.

Herein the signal takes the form of linear movement with an increase in pressure in the line L producing downward movement of the rod 23, as viewed in Fig. 1. This signal or movement will hereinafter be known as the "reducing" signal, while opposite movement will be known as the "increasing" signal. To the end that such movement may be translated into control of the valves 11 and 14, there is carried by the rod 23 a second cam 27 and an end abutment 28. The cam 27, as best seen in Fig. 3, has a cam surface S which is divided into two portions, ranges, or the like S1 and S2. The range or portion S1 extends obliquely to the axis of the rod 23, widening progressively in the direction of a "reducing" signal or movement, that is, downwardly, as herein arranged, while the portion S2 extends parallel with the axis of the rod 23.

Means is provided herein to actuate or control the primary device governing means, that is, the valve 11. This means again includes a regulator of the Askania jet type and comprise a pivoted jet pipe 31 discharging fluid impinging against a pair of orifices 32 connected by conduits 33 to opposite ends of a cylinder 34. Reciprocable in the cylinder 34 is a piston 35 connected by a linkage 36 of appropriate character to the butterfly valve 11. Bearing at one side against the jet pipe 31 is a compression spring 37 disposed at right angles to the direction of movement of the cam 27 and carrying a cam follower 38 bearing against the cam surface S. Completing the regulator is a pressure responsive device 39 acting on the jet pipe 31 in opposition to the spring 37 and serving to measure the volume of air flow through the blower B by measuring the pressure differential across an orifice 40 positioned in the intake 10. The pressure responsive device 39, of course, functions in well known manner to restore the jet pipe 31 to neutral position when, as a result of adjustment of the valve 11, the flow of air through the blower has been increased or decreased in accordance with the signal. It will be understood that the means just described functions to close the valve 11, that is, reduce the flow, when the signal means 15 generates a "reducing" signal and vice versa.

It will be readily apparent that when the signal enters the range S2, that is, when there has been such "reducing" movement of the rod 23 that the cam follower 38 rides on the surface S2, a further change in signal has no effect on the control means for the valve 11, for obviously continued longitudinal movement of the cam 27 will not produce any movement of the follower 38 laterally of the cam. Thus the means controlling the valve 11 is responsive only to a certain portion or range of the signal. If now the system is adjusted to maintain minimum flow through the blower at the point of intersection between the two signal ranges, then the valve 11 and its associated control means will always maintain the flow of air through the blower at or above that minimum. Minimum flow is a flow slightly in excess of that producing the maximum pressure for a given speed of operation of the blower. With varying speeds of the blower B the minimum flow would be represented by a curved line F (Fig. 2). Where, as here, the blower is driven at a constant speed the minimum flow will be determined with relation to that particular speed and will have a constant value represented by the line Q3.

Coming into operation when the signal falls in the portion or range S2 is a means for governing the auxiliary means exercising control over the condition, namely, the valve 14. This governing means comprises a regulator of the Askania jet type comprising a pivoted jet pipe 45 discharging fluid against a single orifice 46 communicating by means of a conduit 47 with one end of a cylinder 48. Reciprocable in the cylinder is a piston 49 connected by a suitable linkage 50 to the valve 14 and having a compression spring 51 urging the same in opposition to the fluid in the cylinder 48. Interposed in the conduit 47 is a pressure responsive device 52 acting on the jet pipe 45 in opposition to a compression spring 53. The spring 53 is interposed in the path of the rod 23 and is contacted by the end 28 of the rod simultaneously with the reaching of the intersection between the surfaces S1 and S2 of the cam 27 by the follower 38. Continued movement of the rod 23 downwardly, as viewed in Fig. 1, places the spring 53 under progressively greater compression and the regulator is herein arranged to produce greater and greater pressure in the conduit 47 as a result of such compression of the spring 53. This in turn actuates the piston 49 which is here so connected with the valve 14 as to open the same progressively as the piston is actuated by fluid pressure in the cylinder 48.

Having described the mechanism, the operation thereof will now be briefly described. For this purpose assume that the pressure in the line L is substantially at the value desired to be maintained. At that pressure the signal generating means 15 will have its rod 23 so positioned that the follower 38 will be riding approximately midway of the surface S1, and the end 28 will not be compressing the spring 53 at all or only so lightly as not to cause generation of a pressure sufficient to overcome spring 51. Under these circumstances the valve 14 will be completely closed and there will be no flow of air through the by-pass 13, while valve 11 will be intermediate its full open position and the partially closed position which it may assume and still assure that the volume of air being delivered by the blower is not below the minimum that may be delivered and still keep the operation of the blower stable.

If now it is assumed that the pressure in the line L increases, due either to smaller consumption or some other factor, this increased pressure will through action on the pressure responsive device 16 cause the signal generating means to generate a signal of a predetermined character calling for a reduction in the air being supplied to the line L. This signal herein, of course, is in the form of linear movement of the rod 23 and the parts carried thereby, and this movement herein is downward, as viewed in Fig. 1. As a result of such longitudinal downward movement of the cam 27 with the rod 23, the follower 38 riding on the surface S1 of the cam 27 moves laterally inwardly of the direction of cam movement, reducing the compression of the spring 37, producing an unbalance between the spring 37 and the pressure device 39 with resultant pivoting of the jet 31 in a clockwise direction. With such pivoting a pressure unbalance is caused on the piston 35, actuating the same to adjust the valve 11 closer to its minimum open position. This, of course, reduces the flow of air through the intake 10 and thus reduces the pressure differential across the orifice 40, thereby restoring balance between the pressure device 39 and the spring 37, and the jet 31 is again positioned in its neutral position. This change in signal has not been sufficient to bring the same in the range or portion S2 and there is thus no material change in so far as the valve 14 is concerned, and this valve thus remains closed. The blower B thus simply discharges a smaller volume of air.

Should further reduction in the consumption of air or some other factor continue to cause the pressure in the line L to rise above the value desired, the operations just described will be continued until the rod 23 has been advanced to such extent that the follower 38 rides at the juncture between the surfaces S1 and S2 of the cam 27. Should the pressure continue to rise, the signal generated by the means 15 may be said to take on a different character or to fall in a different portion or range, namely, one in which the means controlling the valve 14 is now responsive to the signal, while the means controlling the valve 11 is no longer responsive. In terms of the particular construction disclosed in Fig. 1, this means that the follower 38 has now reached the juncture point of the surfaces of cam 27 and further downward movement of the cam 27 merely causes the follower 38 to ride on the surface S2 without change in lateral position. This means, of course, that the valve 11 will not reduce the flow through the blower below the minimum flow and thus assures that the blower is still operating on the far or large output portion of its performance curve and thus is maintained in a state of stable operation.

Such additional downward movement of the rod 23, however, now compresses the spring 53 thereby pivoting the jet pipe 45 and causing it to create a larger pressure in the conduit 47. This pressure is now sufficient to overcome the spring 51 moving the piston 49 upwardly and opening partially the valve 14. By by-passing a portion of the air the pressure in the line L is thus reduced without reducing further the output of the blower which would result in unstable operation of the blower.

Should the pressure in the line L drop due to increased load or some other factor, the operation described would be reversed with the rod 23 of the signal generating means now moved upwardly in proportion to the drop in pressure. This would bring about, first, a response by the means controlling the by-pass valve 14, and only after the by-pass had been completely or substantially closed would the means controlling the valve 11 respond to the signal. Thus it is seen that in this system the control means governing the condition to be controlled are serially responsive to the signal with the means controlling the output of the blower the first to respond so long as the blower is delivering a volume above a predetermined minimum, and ceasing to be responsive to the signal when the signal calls for a reduction below that minimum.

In Fig. 4 there is disclosed an alternative form of signal generating means 15'. This means comprises a pressure responsive device 16' adapted to be connected by means of a conduit 17' to the line L. Influenced by the pressure responsive device 16' is pivoted jet pipe 19' opposingly influenced by a compression spring 55 interposed between the jet pipe 19' and a stationary abutment 56. The jet pipe 19' is part of an Askania jet type regulator and operates in well known manner to discharge a jet of fluid against a pair of orifices 20' one of which is by a conduit 57 connected to one end of a cylinder 21' and the other of which is by a conduit 58 connected to one end of a cylinder 59. The other end of the cylinder 59 is by a conduit 60 connected to the remaining end of the cylinder 21'. Reciprocable in the cylinder 21' is a piston 22' having a rod 23' projecting through one end of the cylinder and carrying a cam 27'. Reciprocable in the cylinder 59 is a piston 61 having a bleed passage therearound so as to permit gradual restoration of the piston to a normal position by a spring 62. This stabilizer piston and cylinder is more fully disclosed and claimed in U. S. Letters Patent No. 1,959,889. Secured to the piston 61 and projecting through one end of the cylinder 59 is a piston rod 63 pivotally connected at one end to a beam 64 fulcrumed at 65 and connected at the other end to the diaphragm of the pressure responsive device 16' through the medium of a spring 66.

In Fig. 5 there is disclosed a modified form of control circuit for governing a condition, herein for maintaining substantially constant the air pressure in a conduit L'. As in the basic form, primary control over the air pressure is exercised by a blower B' which supplies the air to the line L' with the output of the blower controlled by throttling of the intake conduit 10' by means of a butterfly valve 11' as distinguished from control of the speed of the blower, the blower being driven at a constant speed by motor M'. Auxiliary control over the pressure in the line L' is exercised by means of a by-pass 13' governed by a valve 14' of suitable construction. The valves 11' and 14' are still serially responsive to a signal generated by a signal generating means 15''. The signal generated by the means 15'' has different ranges or portions to which the actuating means for the valves 11' and 14' are respectively responsive, with the means controlling the valve 11' again acting as a minimum flow regulator preventing the blower from operating on the unstable portion of its operating curve. The signal generated, however, takes the form of pressure instead of linear movement and thus particularly adapts itself and is advantageous over the form disclosed in Fig. 1 for the control of a plurality of blowers connected to supply the same load.

The signal generating means 15'' comprises a regulator 70 of the Askania jet type including a pressure responsive device 71 connected by means of a conduit 72 with the line L'. The pressure responsive device 71 bears at one end against a lever 73 fulcrumed at 74 and engaged at its remaining end by a tension spring 75. Transmitting rocking of the lever 73 to a pivoted jet pipe 76 is a linkage mechanism 77. The jet pipe 76 discharges oil in well known manner against a pair of orifices one of which is connected by a conduit 78 with one end of a cylinder 79, and the other of which is by a short conduit 80 connected to one end of a small cylinder 81. The remaining end of the cylinder 81 is by a conduit 82 connected to the remaining end of the cylinder 79. Cylinder 79 has a piston 83 therein, while the cylinder 81 has a piston 84 therein and a piston rod 85 projecting through both ends of the cylinder. Engaging one end of the rod 85 is a spring 86 serving yieldably to retain the cylinder 84 in an intermediate or neutral position. Gradual restoration of the cylinder to neutral position by the spring after displacement of the cylinder is permitted by the bleed passage 87 connecting opposite ends of the cylinder 81. The remaining end of the rod 85 is connected to a lever 88 fulcrumed at 89 and bearing at its opposite end against a compression spring 90 which at its other end bears against the jet pipe 76 in opposition to the spring 75.

Secured to the piston 83 and projecting through one end of the cylinder 79 is a piston rod 91 suitably connected to a valve 92 to control the same in accordance with the demands of the regulator 70. The valve 92 is an element of a second means or portion of the signal generating means and under the control of the regulator 70 generates a signal in the form of pressure which bears a definite relationship to the change in pressure in the line L'. This second means comprises a pump P driven by a motor 93 discharging fluid to a conduit 94 which in turn discharges to atmosphere through a restricting, fixed orifice 95. The volume of fluid supplied to the portion of the conduit 94 intermediate the valve 92 and the orifice 95 is, of course, determined by the valve 92 and by such variation the pressure of the fluid in that portion of the conduit will also be varied and determined. It is the pressure of the fluid in this portion of the conduit 94 that constitutes the signal being generated. The regulator 70 and the valve 92 controlled thereby are so arranged that an increase in pressure in the line L' results in a decrease in the pressure signal generated, while a decrease in pressure in the line L' results in the generation of a signal having correspondingly increased pressure values. Connected to the conduit 94 intermediate the valve 92 and the fixed orifice 95 is a conduit 96 which thus carries the master signal or master pressure for the control of any number of pressure responsive means governing any number of blowers B' or auxiliary control means, such as the by-pass 13'.

Herein the control means for but a single blower and by-pass are shown in detail, but it will be readily understood how a second, third, etc. similar control means, represented by the broken line rectangles II and III, could be connected to the conduit 96 and similarly governed by the master signal or master pressure. Leading from the conduit 96 is a conduit 97 having branches 98 and 99. The first of the branches leads to the pressure responsive device 100 of a regulator, generally designated 101. This regulator is again of the Askania jet type having a pivoted jet 102. The jet 102 is influenced by the pressure device 100 through the medium of a linkage system 103 which includes a plurality of springs 104 and 104a. More specifically, the linkage system comprises a beam 103a pivoted intermediate its ends on a fulcrum 103b and having one end 103c terminating opposite the pressure responsive device 100 to be engaged and rotated in a counterclockwise direction, as viewed in Fig. 5, when the pressure on the device 100 rises above a predetermined and critical value. Acting on the opposite end of the beam 103a and tending to urge the beam in a clockwise direction is the compression spring 104a. Rotation of the beam 103a in either direction is preferably limited by stops 103d. Transmitting counterclockwise movement of the beam 103a to the pivoted jet pipe 102 is a right angle member 103e pivoted at the intersection of its arms of a fulcrum 103f. Herein the horizontal arm is positioned for contact by the end 103c of the beam while the vertical arm through a link 103g is connected to the jet 102. The spring 104 is an adjustable spring, is connected at one end to the link 103g and serves to maintain minimum flow of air through the blower as will presently become more apparent.

Completing the regulator 101 is a double chambered, pressure responsive device 105 which measures the volume of air being delivered by the blower B' by measuring the pressure differential across an orifice 106 disposed in the intake 10'. The device 105 acts on the jet pipe 102 in opposition to the spring 104, so as to maintain a certain minimum flow of air through the blower, and also acts in opposition to the device 100, when the pressure on that device is high enough to render it effective, so as to restore the jet pipe 102 to neutral position when proper adjustment in the flow of air through the blower has been made. A brief statement of the operation of the regulator 101 may facilitate understanding. The predetermined and critical value of the master pressure is, of course, that value where there is a change in responsiveness by the primary and the auxiliary control means. At any value of the master pressure above this critical value, the regulator 101 will be substantially in the position shown in Fig. 5, assuming that an equilibrium condition exists. With any rise in pressure of the master signal, the jet 102 will be temporarily displaced from its neutral position until restored by adjustment of the flow through the blower. With the value of the master pressure or signal dropping below the critical value, the spring 104a will overcome the device 100 and will rotate the beam 103 in a clockwise direction until arrested by abutment with the lower one of the stops 103d. The influence of the device 100 thus will be entirely removed and control will be entirely under the spring 104 which, as previously stated, has been adjusted to maintain through cooperation with the device 105 the minimum permissible flow of air through the blower.

Controlled by the regulator to actuate the valve 11' in accordance with the signal is a piston and cylinder device having a cylinder 107 and a piston 108 reciprocable therein and connected through suitable linkage 109 with the valve 11'. Opposite ends of the cylinder 107 are by conduits 110 connected to orifices 111 against which the jet from the jet pipe 102 impinges in well known manner.

It is believed apparent from the foregoing that the means governing the blower is responsive to the signal only when it is in its upper range and that, as the master pressure or signal increases in value, the valve 11' will be opened wider and wider to increase the output of the blower, and that, as the master signal or pressure decreases, the valve 11' will be progressively closed to decrease the output of the blower. At a certain point, however, further reduction in the master signal has no further effect on the means governing the blower. This point is so selected that the output of the blower is still above that volume which assures operation of the blower on the stable portion of its operating curve.

Branch 99 leads to a pressure responsive device 115 which functions as the control means for the by-pass valve 14'. The valve 14' is through the medium of a spring 116 biased to open position, with the force of the spring and the force of the device 115 being so adjusted that the device 115 overcomes the spring and maintains the valve 14' closed so long as the master pressure or signal is at or above that value to which the regulator 101 is responsive. When the master signal or pressure drops below that critical or common value, the spring 116 overcomes the device 115 to progressively greater extents and accordingly opens the valve 14' and the by-pass 13' controlled thereby to a progressively greater extent. The means for controlling the valve 14' thus can be said to respond only to the lower portion or range of the master signal and thus the means for governing the blower and the means for governing the by-pass are serially responsive to the signal.

Having described the mechanism, the operation thereof will be briefly described. For this purpose, assume that the pressure in the line L' is substantially the pressure desired. This pressure acting through the pressure device 71 of the regulator 70 and through the second means of the signal generating means sets up a master signal or pressure which probably will fall, and herein at least is assumed to fall, in that range of pressures to which the regulator 101 is responsive. If now, due to drop in consumption of air or for some other reason, the pressure in the line L' rises, that increase in pressure will cause the signal generating means 15'' to produce a correspondingly smaller master signal or pressure. This reduced master signal will through the regulator 101 and actuating means 107, 108 cause the valve 11' to be adjusted in a direction reducing the output of the blower. With continued rise in the pressure in the line L', the operation just described will be continued until the master pressure or signal reaches that minimum value to which the regulator 101 is responsive. Further reduction in the master signal, due to continued high pressure in the line L', will then have no further effect on the regulator 101 and the valve 11' will remain in such partially open position as will assure operation of the blower at such volume as to keep it operating on the stable portion of its performance curve. The signal now is in its lower range to which the device 115 is responsive and the spring 116 will open the valve 14' to permit by-passing of the air and thus serves to reduce the pressure in the line L'.

If now it be assumed that the pressure in the line L' drops, the operation and particularly the sequence in which the valves 14' and 11' will be actuated will be reversed. Initially the valve 14', unless already in closed position, will be closed for, as the pressure in the line L' drops, the master signal or pressure increases and thus will progressively overcome the spring 116 until the valve 14' is completely closed. Should such closing of the by-pass be insufficient to bring the pressure in the line L' back to the desired value, the means controlling the valve 11' will now come into operation and will open the valve 11' progressively as the master pressure or signal rises.

It is believed apparent that this form of control circuit, like the circuit disclosed in Fig. 1, functions in a novel manner to control a condition and assures proper control even though influencing the condition thereby controlled is a primary device having an inherently unstable performance curve. This satisfactory operation is assured at all times and under all conditions and is not dependent upon chance balancing of the various control factors nor upon a fortunate time rate of responsiveness of the various control means or elements.

I claim as my invention:

1. A control system for use with an apparatus having a variable condition which is to be controlled and a primary device in the nature of a supply source influencing the condition comprising signal generating means, including a device responsive only to the condition to be controlled, operable to generate a signal which is a function of the condition, means governing operation of the primary device, means responsive to the control signal and to the rate of operation of the primary device to actuate said primary device governing means, said last named means being actively responsive to the signal only when the signal is in a certain portion of its range, auxiliary means exercising control over the condition and governing means for said auxiliary means responsive only to the control signal and actively responsive only when the signal is in a portion of its range different from the first named range.

2. A control system for use with an apparatus having a variable condition which is to be controlled and a primary device in the nature of a supply source influencing the condition comprising signal generating means, including a device responsive only to the condition to be controlled and means controlled by said last named device for translating change in the condition into a signal which is a function of the condition, means governing operation of the primary device, means for actuating said governing means including means responsive to the control signal and means responsive to the operation of the primary device, said governing means actuating means being operable to maintain a certain minimum operation of the primary device, auxiliary means exercising control over the condition, and governing means for said auxiliary means responsive only to the control signal and only when the primary device is near its certain minimum operation.

3. A control system for use with an apparatus having a variable condition which is to be controlled and a primary device in the nature of a supply source influencing the condition comprising signal generating means, including a device responsive only to the condition to be controlled, and means controlled only by said last named device for translating change in the condition into movement of an element, a cam carried by said element, means governing operation of the primary device, means for actuating said governing means including a follower engaging said cam and means responsive to the operation of the primary device, said cam being effective to cause change in the operation of the primary device for a portion only of the movement of said element, auxiliary means exercising control over the condition, and governing means for said auxiliary means actuated by said element after predetermined movement of said element in a direction calling for reduction in the condition to be controlled.

4. A control system for use wth an apparatus having a variable condition which is to be controlled and a primary device in the nature of a supply source influencing the condition comprising signal generating means including a device responsive to the condition to be controlled, means under the sole influence of said last named device generating a signal in the form of movement of an element and a cam carried by said element also operable to influence said last mentioned means and cause said last mentioned means to translate change in the condition into movement of said element which is a function of the condition, means governing operation of the primary device, a second cam carried by said element, means for actuating said governing means including a follower engaging said second cam and means responsive to the operation of the primary device, said second cam being effective to cause change of the primary device in proportion to movement of said element but for a portion only of such movement of said element, auxiliary means exercising control over the condition, and governing means for said auxiliary means actuated by said element after predetermined movement of said element in a direction calling for reduction in the condition to be controlled.

5. A control system for use with an apparatus having a variable condition which is to be controlled and a primary device in the nature of a supply source influencing the condition comprising signal generating means including a device responsive to the condition to be controlled and means controlled by said last named device for translating change in the condition into a signal in the form of linear movement of an element which is a function of the condition, the element having an advancing movement when calling for a reduction in the condition and a retracting movement when calling for an increase in the condition, a cam carried by said element having a cam surface with a first portion extending generally parallel with the direction of movement of said element and a second portion extending progressively laterally of the path of said element considered in the advancing direction of said element, means governing operation of the primary device, means for actuating said governing means including a follower engaging said cam and mounted for movement laterally of the path of movement of said element and means responsive to the operation of the primary device, auxiliary means exercising control over the condition, and governing means for said auxiliary means actuated by said element after said cam follower leaves said second cam surface and rides on the first cam surface.

6. A control system for use with an apparatus having a variable condition which is to be controlled and a primary device in the nature of a supply source influencing the condition comprising means responsive to the condition to be controlled, means under the control of said last named means for generating a signal in the form of pressure varying as a function of the condition to be controlled, means including pressure responsive means for controlling the operation of the primary device, said last named means responding to a portion only of the signal and being operative to maintain a certain minimum operation of the primary device, and auxiliary means exercising control over the condition to be controlled including pressure responsive means responding to a portion of the signal different from the portion responded to by said primary device control means and taking over control of the condition to be controlled when the primary device is at its certain minimum operation.

7. A control system for use with an apparatus having a variable condition which is to be controlled and a primary device in the nature of a supply source influencing the condition comprising means responsive to the condition to be controlled, means under the control of said last named means for generating a signal in the form of pressure varying as a function of the condition to be controlled, means for controlling the operation of the primary device, means for governing said last named means including pressure means responsive to the signal and counteracting means responsive to the operation of the primary device, said governing means responding to a portion only of the signal and maintaining operation of the primary device above a certain minimum, and auxiliary means exercising control over the condition to be controlled including pressure responsive means responding to a portion of the signal different from the portion responded to by said primary device control means and taking over control of the condition to be controlled when the primary device is at its certain minimum operation.

8. A control system for use with an apparatus having a variable condition which is to be controlled and a primary device in the nature of a supply source influencing the condition comprising means for generating a signal which is a function of change in the condition to be controlled comprising a regulator of the pivoted jet pipe type including a pivoted jet pipe, means responsive to the condition to be controlled acting to displace said jet pipe from neutral position upon change in the condition and means operable as a result of displacement of said jet pipe to restore said jet pipe to neutral position, said last mentioned means including a bleed passage for gradually removing the restoring influence of said last mentioned means and pressure generating means controlled by said regulator to generate a master signal pressure, means governing the operation of the primary device, a regulator for controlling the primary device governing means including means responsive to the master signal pressure and means responsive to the operation of the primary device, and an auxiliary means exercising control over the condition to be controlled including means responsive to the master signal pressure, the last mentioned means and the pressure responsive means of said last mentioned regulator responding actively to different ranges of pressures of the master signal with said last named regulator ceasing to respond actively while the primary device is still operating above a certain minimum rate.

9. A control system for use with an apparatus having a variable condition which is to be controlled and a primary device in the nature of a supply source influencing the condition comprising means for generating a signal which is a function of change in the condition to be controlled comprising a regulator of the pivoted jet pipe type including a pivoted jet pipe, means responsive to the condition to be controlled acting to displace said jet pipe from neutral position upon change in the condition and means operable as a result of displacement of said jet pipe to restore said jet pipe to neutral position, said last mentioned means including a bleed passage for gradually removing the restoring influence of said last mentioned means and pressure generating means controlled by said regulator to generate a master signal pressure increasing with rise in the condition to be controlled and decreasing with fall in the condition to be controlled, means governing the operation of the primary device, means controlling said primary device governing means biased to maintain a certain minimum operation of the primary device and including means responsive to the master signal pressure when in its upper range, auxiliary means exercising control over the condition to be controlled biased to tend to reduce the condition, and means responsive to the master signal pressure operable to hold said auxiliary means ineffective so long as the master signal pressure is in the range to which the pressure responsive means of said primary device controlling means is responsive.

10. A system for controlling pressure in a line supplied from a blower driven at a constant speed comprising signal generating means including a device responsive to the pressure in the line operable to generate a signal which is a function of the pressure in the line, auxiliary means exercising control over the pressure in the line, and a plurality of means each responsive to the signal and respectively governing the blower and the auxiliary means to operate in sequence and independently of other means to control the pressure in the line.

11. A system for controlling pressure in a line supplied from a blower driven at a constant speed comprising signal generating means including a device responsive to the pressure in the line operable to generate a signal which is a function of the pressure in the line, means governing the output of the blower, means controlling said blower governing means including means responsive to a portion of the signal, auxiliary means exercising control over the pressure in the line, and control means for said auxiliary means responsive to a different portion of the signal, the signal responsive means functioning in sequence, and with the blower control means maintaining a minimum output of the blower.

12. A system for controlling pressure in a line supplied from a blower driven at a constant speed comprising signal generating means including a device responsive to the pressure in the line operable to generate a signal which is a function of the pressure in the line, a single means for governing the operation of the blower, a regulator for controlling said blower governing means including means responsive to a portion of the signal and means responsive to the rate of operation of the blower, said regulator being operable to maintain a certain minimum operation of the blower, by-pass means connected to the line, and means controlling said by-pass means including means responsive to the signal and operable to come into play only when said regulator has reduced the blower to minimum operation.

13. A system for controlling pressure in a line supplied from a blower comprising signal generating means including a device responsive to the pressure in the line operable to generate a signal in the form of movement of an element which is a function of the pressure, a cam carried by said element having a first cam surface substantially parallel with the movement of said element and a second cam surface extending obliquely to the direction of movement of said element, means for governing the operation of the blower, a regulator for controlling said blower governing means including a cam follower engaging said cam and means responsive to flow of air through the blower acting in opposition to the cam follower, a by-pass connected to the line having a valve controlling the same biased to closed position, and pressure generating means controlled by said element and coming into operation when the cam follower is at the juncture of the cam surfaces to generate a pressure operable progressively to overcome the bias on said by-pass valve and to open said valve as said element continues its movement in a direction calling for further reduction in the pressure in the line.

14. A system for controlling pressure in a line supplied from a blower comprising signal generating means including a device responsive to the pressure in the line operable to generate a signal in the form of pressure, the signal increasing in value with rise in pressure in the line and decreasing in value with a drop in pressure in the line, means governing the operation of the blower, means controlling said blower governing means comprising a regulator having a pressure responsive device responsive to the pressure of the signal, a device responsive to the flow of air through the blower acting in opposition to said last named pressure responsive device and means biasing said regulator to respond only to signal pressures above a certain value which value maintains a certain minimum of the blower, a by-pass connected to the line including a valve normally biased to open position, and a pressure responsive device responsive to the signal pressure and operable so long as the signal pressure is above the pressure maintaining operation of the blower to maintain said by-pass valve closed.

15. A system for controlling pressure in a line supplied from a blower driven at a constant speed comprising signal generating means including a device responsive to the pressure in the line operable to generate a signal which is a function of the pressure in the line, means governing operation of the blower throughout that range of operation of the blower wherein the volume of gas delivered is larger than a predetermined critical volume, means responsive to the control signal and to the rate of operation of the blower to actuate said blower governing means, said control signal maintaining operation of the blower above the critical volume at all times, auxiliary means exercising control over the pressure in the line, and governing means for said auxiliary means responsive only to the control signal and only when the signal calls for a reduction in the volume of discharge below the critical volume.

HERBERT ZIEBOLZ.

REFERENCES CITED

The following references are of record in the file of this patent:

UNITED STATES PATENTS

| Number | Name | Date |
|---|---|---|
| 1,154,959 | Banner | Sept. 28, 1915 |
| 1,280,811 | Moss | Oct. 8, 1918 |
| 1,280,843 | Rice | Oct. 8, 1918 |